United States Patent Office 2,741,615
Patented Apr. 10, 1956

2,741,615

N-SUBSTITUTED DIHYDRODESOXYNORCODEINE COMPOUNDS

Robert L. Clark, Woodbridge, N. J., assignor to Merck & Co., Inc., Rahway, N. J., a corporation of New Jersey No Drawing. Application November 22, 1952, Serial No. 322,147

13 Claims. (Cl. 260—285)

This invention is concerned generally with novel derivatives of morphine and with processes for preparing these morphine derivatives. More particularly, it relates to novel N-substituted dihydrodesoxynorcodeine compounds having attached to the nitrogen atom the terminal carbon of a straight aliphatic chain consisting of three carbon atoms, to acid salts thereof, and to novel processes for preparing these compounds starting with dihydrodesoxynorcodeine or with the corresponding N-substituted desoxynorcodeine compound. These N-substituted dihydrodesoxynorcodeine compounds, and salts thereof, are active as morphine antagonists.

The N-substituted dihydrodesoxynorcodeine compounds, and acid salts thereof, subject of the present invention, may be chemically represented by the following structural formula:

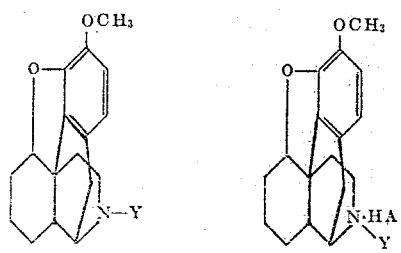

wherein Y is an aliphatic radical containing a straight chain consisting of three carbon atoms, a terminal carbon of which is attached to the nitrogen atom, and HA is an acid.

The chemical relationship of these N-substituted dihydrodesoxynorcodeine compounds to morphine is clear from a comparison of the foregoing formulae with the formula for morphine which is as follows:

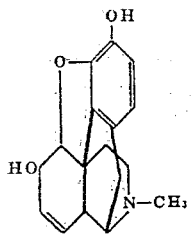

Whereas the alkaloid morphine is a potent analgesic, I have found that N-substituted dihydrodesoxynorcodeine compounds having attached to the nitrogen atom the terminal carbon of a straight aliphatic chain consisting of three carbon atoms, in particular N-n-propyldihydrodesoxynorcodeine, N-isobutyldihydrodesoxynorcodeine, N-allyl dihydrodesoxynorcodeine, N-methallyldihydrodesoxynorcodeine, and acid salts thereof, do not possess any significant analgesic action but, instead, are strong morphine antagonists and prevent or abolish the analgesic action of morphine when utilized in conjunction with that drug. This antagonistic action possessed by the subject compounds is particularly surprising in view of the fact that other N-alkyldihydrodesoxycodeine compounds, such as N-methyldihydrodesoxynorcodeine (i. e. dihydrodesoxycodeine), N-n-butyldihydrodesoxynorcodeine, N-amyldihydrodesoxynorcodeine and N-hexyldihydrodesoxynorcodeine exhibit no appreciable morphine antagonistic activity.

The N-substituted dihydrodesoxynorcodeine compounds having attached to the nitrogen atom the terminal carbon of a straight aliphatic chain consisting of three carbon atoms, and acid salts thereof, can be prepared by reactions which may be chemically represented as follows:

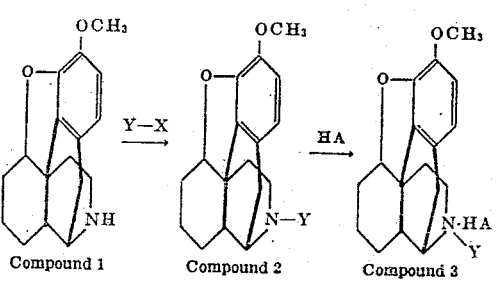

Compound 1    Compound 2    Compound 3 wherein Y is an aliphatic radical containing a straight chain consisting of three carbon atoms a terminal carbon of which is attached to the nitrogen atom, X is a halo radical and HA is an acid.

The reactions indicated hereinabove are carried out as follows: Dihydrodesoxynorcodeine (Compound 1) is reacted with an aliphatic halide of the formula Y—X wherein X and Y have the significance defined hereinabove, thereby forming the corresponding N-substituted dihydrodesoxynorcodeine compound (Compound 2); the latter compound is reacted with an acid to produce the corresponding salt of said N-substituted dihydrodesoxynorcodeine compound (Compound 3).

The dihydrodesoxynorcodeine, which is used as starting material in my novel process, is a new compound which can be prepared by reacting the available desoxycodeine with cyanogen bromide in chloroform solution to form N-cyanodesoxynorcodeine; heating said N-cyanodesoxynorcodeine with aqueous hydrochloric acid thereby hydrolyzing the nitrile substituent and decarboxylating the resulting N-carboxydesoxynorcodeine to produce desoxynorcodeine; and reacting the latter compound with hydrogen under pressure in the presence of palladium chloride catalyst to form dihydrodesoxynorcodeine.

The aliphatic halides which react with dihydrodesoxynorcodeine to form my novel N-substituted dihydrodesoxynorcodeine compounds contain a straight aliphatic chain consisting of three carbon atoms the terminal carbon of which is attached to the halogen atom; in one preferred embodiment of my invention, a methyl grouping is connected to the middle carbon atom of this straight aliphatic chain. I prefer to employ as the aliphatic halide an n-propyl halide such as n-propyl chloride, n-propylbromide, n-propyl iodide, an isobutyl halide such as isobutyl chloride, isobutyl bromide, isobutyl iodide, an allyl halide such as allyl chloride, allyl bromide, allyl iodide, a methallyl halide such as methallyl chloride, methallyl bromide, methallyl iodide, and the like. The reaction between the aliphatic halide and dihydrodesoxynorcodeine is ordinarily conducted by heating the reactants together in contact with an acid-binding agent in a liquid medium which is substantially inert under the reaction conditions and which is a solvent for the reactants. I prefer to utilize, as the liquid medium, a lower aliphatic alcohol such as methanol, ethanol, propanol, and the like. The liquid medium employed should be substantially free of water. As the acid-binding agent I ordinarily utilize an alkali metal carbonate, such as sodium carbonate, potassium carbonate, an alkali metal bicarbonate such as sodium bicarbonate, potassium bicarbonate, an alkaline earth metal carbonate, such as calcium carbonate, barium carbonate, and the like. I prefer to conduct the reaction by bringing together, in an organic solvent, approximately equimolar quantities of dihydrodesoxynorcodeine and the aliphatic halide, and heating the solution under reflux in contact with an excess of the acid-binding agent for an extended period of time. I have found that, under these reaction conditions, a heating period of about eight hours or more is ordinarily required to complete the reaction between the dihydrodesoxynorcodeine and the aliphatic halide.

In accordance with the foregoing procedure, there is obtained the corresponding N-substituted dihydrodesoxynorcodeine compound having attached to the nitrogen atom the terminal carbon of a straight aliphatic chain consisting of three carbon atoms which may have a methyl grouping attached to the middle carbon atom of said chain, as, for example N-n-propyldihydrodesoxynorcodeine, N-isobutyldihydrodesoxynorcodeine, N-allyldihydrodesoxynorcodeine, and N-methallyldihydrodesoxynorcodeine. The N-substituted dihydrodesoxynorcodeine is conveniently recovered by evaporating the organic solvent from the reaction mixture, preferably under reduced pressure, and extracting the residual material with a solvent such as ether. The ethereal extract is filtered and the filtered solution is evaporated to dryness to give the N-substituted dihydrodesoxynorcodeine compound in crude form; this crude material can be purified by recrystallization from lower aliphatic alcohols such as methanol and ethanol.

Alternatively, the N-substituted dihydrodesoxynorcodeine compounds having attached to the nitrogen atom a terminal carbon of a straight aliphatic chain consisting of three carbon atoms may be prepared by hydrogenation of the corresponding N-substituted desoxynorcodeine compounds. This procedure is ordinarily used, however, only for the preparation of N-alkyldihydrodesoxynorcodeine compounds such a N-n-propyldihydrodesoxynorcodeine and N-isobutyldihydrodesoxynorcodeine since hydrogenation of N-alkenyldesoxynorcodeine compounds, such as N-allyldesoxynorcodeine or N-methallyldesoxynorcodeine, results in the formation of the corresponding N-alykldihydrodesoxynorcodeine compound.

The N-substituted desoxynorcodeine compounds utilized as starting materials in this alternate procedure, namely the N-alkyldesoxynorcodeine compounds and the N-alkenyldesoxynorcodeine compounds can be prepared by reacting the available normorphine with the appropriate aliphatic halide in the presence of an acid-binding agent utilizing substantially the same procedure as that described hereinabove in connection with the reaction between dihydrodesoxynorcodeine and aliphatic halides, thereby forming the corresponding N-substituted normorphine having attached to the nitrogen atom a terminal carbon of a straight aliphatic chain consisting of three carbon atoms, such as N-n-propylnormorphine, N-isobutylnormorphine, N-allylnormorphine, N-methallylnormorphine, and the like; this N-substituted normorphine compound is reacted, in ethanol, with phenyltrimethylammonium hydroxide to form the corresponding N-substituted norcodeine compound which is reacted, in pyridine, with p-toluene sulfonyl chloride to produce the 6-p-toluene sulfonate of said N-substituted norcodeine compound; the latter compound is then reacted, in tetrahydrofuran, with lithium aluminum hydride thereby forming the corresponding N-substituted desoxynorcodeine compound having attached to the nitrogen atom a terminal carbon of a straight aliphatic chain consisting of three carbon atoms such as N-n-propyldesoxynorcodeine, N-isobutyldesoxynorcodeine, N-allyldesoxynorcodeine, N-methallyldesoxynorcodeine, and the like, used as starting material in my hydrogenation procedure.

The reaction between the N-substituted desoxynorcodeine compound and hydrogen is carried out by dissolving the N-substituted desoxynorcodeine compound in a lower aliphatic alcohol such as methanol or in a lower alkanoic acid such as acetic acid, or aqueous solutions thereof, and bringing the resulting solution into intimate contact with hydrogen in the presence of a hydrogenation catalyst such as platinum, palladium, or halides thereof. In a preferred embodiment of my procedure, the N-substituted desoxynorcodeine compound is dissolved in an aqueous solution of acetic acid and the resulting solution is intimately contacted with hydrogen at a pressure somewhat below 100 pounds per square inch, preferably at about 40 pounds per square inch, at a temperature of about 30° C., and in the presence of a palladium catalyst. The N-alkyldihydrodesoxynorcodeine compound thus produced can be recovered by filtering the hydrogenation mixture, making the filtered solution alkaline with ammonium hydroxide, whereby the N-alkyldihydrodesoxycodeine crystallizes therefrom and can be recovered by filtration.

The conversion of the N-substituted dihydrodesoxynorcodeine compounds to the corresponding acid salts is ordinarily conducted by reacting the N-substituted dihydrodesoxynorcodeine compound under substantially anhydrous conditions, with an acid, as for example, hydrogen chloride, hydrogen bromide, sulfuric acid, acetic acid, tartaric acid, citric acid, and the like. This salt-forming reaction is conveniently carried out by dissolving the N-substituted dihydrodesoxynorcodeine compound in a hot lower alkanol, such as ethanol, methanol, propanol, and the like, and adding to the solution a slight excess of an alcoholic solution of the appropriate acid. Upon diluting the resulting alcoholic medium with an alcohol-miscible non-solvent for the product, such as diethyl ether, there crystallizes from the mixture the acid salt of the N-substituted dihydrodesoxynorcodeine compound such as N-n-propyldihydrodesoxynorcodeine hydrochloride, N-n-propyldihydrodesoxynorcodeine hydrobromide, N-n-propyldihydrodesoxynorcodeine sulfate, N-n-propyldihydrodesoxynorcodeine acetate, N-n-propyldihydrodesoxynorcodeine tartrate, N-isobutyldihydrodesoxynorcodeine hydrochloride, N-isobutyldihydrodesoxynorcodeine hydrobromide, N-isobutldihydrodesoxynorcodeine sulfate, N-isobutyldihydrodesoxynorcodeine acetate, N-isobutyldihydrodesoxynorcodeine tartrate, N-allyldihydrodesoxynorcodeine hydrochloride, N-allyldihydrodesoxynorcodeine hydrobromide, N-allyldihydrodesoxynorcodeine sulfate, N-allyldihydrodesoxynorcodeine acetate, N-allyldihydrodesoxynorcodeine tartrate, N-methallyldihydrodesoxynorcodeine hydrochloride, N-methallyldihydrodesoxynorcodeine hydrobromide, N-methallyldihydrodesoxynorcodeine sulfate, N-methallyldihydrodesoxynorcodeine acetate, N-methallyldihydrodesoxynorcodeine tartrate, and the like. The salt thus formed is recovered from the alcoholic slurry by filtration or centrifugation.

The following examples illustrate methods of carrying out the present invention, but it is to be understood that these examples are given for purposes of illustration and not of limitation.

*Example 1*

A mixture of 3 g. of dihydrodesoxynorcodeine hydrobromide, 1.75 g. of sodium bicarbonate, 1.03 g. of allyl bromide and 25 ml. of absolute ethanol was heated under reflux with stirring for a period of about five hours. At the end of this period some insoluble material was present and was removed by filtration. The filtered solution was evaporated to dryness in vacuo; the residual material was slurried with several portions of diethyl ether, and the ethereal extract was filtered. The filtered ethereal solution was evaporated to dryness in vacuo to give N-allyldihydrodesoxynorcodeine which was obtained in the form of an oil which crystallized upon cooling. The crude product was recrystallized from ethanol to give substantially pure N-allyldihydrodesoxynorcodeine; M. P. 72–74° C.; $[\alpha]_D^{25}=-106°$ (C, 0.96 in ethanol). *Analysis.*—Calc'd for C, 77.11: H, 8.09. Found: C, 77.11; H, 7.81.

The N-allyldihydrodesoxynorcodeine was reacted with ethanolic hydrogen bromide, the alcoholic reaction solution was cooled and the crystalline product which separated was recovered by filtration and purified by recrystallization from ethanol-diethyl ether to give substantially pure N-allyldihydrodesoxynorcodeine hydrobromide; M. P. 214–215° C. *Analysis.*—Calc'd for $C_{20}H_{25}NO_2 \cdot HBr$: C, 61.23; H, 6.68. Found: C, 59.85; H, 6.18.

The dihydrodesoxynorcodeine hydrobromide utilized as starting material in the foregoing process was prepared in accordance with the following three-step procedure:

(1) A solution of 7.8 g. of cyanogen bromide in 25 ml. of dry chloroform was stirred and heated under reflux while adding thereto, dropwise over a period of one hour, a solution of 19.0 g. of desoxycodeine in 45 ml. of dry chloroform. The resulting solution was heated under reflux for an additional period of five hours. The reaction mixture was cooled and diluted with 400 ml. of ether. The ethereal solution was separated from the gummy material, which precipitated, by filtration and the filtered ethereal solution was evaporated to small volume under reduced pressure. The concentrated solution was cooled and the crystalline material which separated was recrystallized from ethyl acetate to give substantially pure N-cyanodesoxynorcodeine; M. P. 149–150° C.; $[\alpha]_D^{25}=-130°$ (C, 0.75 in absolute ethanol). *Analysis.*—Calc'd for $C_{18}H_{18}N_2O_2$: C, 73.45; H, 6.16. Found: C, 73.60; H, 6.20.

(2) A mixture of 33 g. of N-cyanodesoxynorcodeine, 128 ml. of glacial acetic acid, 45 ml. of concentrated aqueous hydrochloric acid and 900 ml. of distilled water was heated at a temperature of about 90° C. for a period of about ninety hours. The resulting reaction mixture was filtered through a mat of activated charcoal. The substantially decolorized, light-yellow filtrate was cooled to about room temperature and an aqueous solution of ammonium hydroxide was added thereto portionwise, whereupon an oil separated. The portionwise addition of the aqueous ammonium hydroxide was continued until no further oil separated. The resulting mixture was then extracted with three portions of ether, the combined ethereal extracts were dried over magnesium sulfate and the ether was evaporated from the dried ethereal solution under reduced pressure. The residual crystalline material was recrystallized from ether to give substantially pure desoxynorcodeine; M. P. 85–86° C.; $[\alpha]_D^{25}=-59°$ (C, 1.2 in absolute ethanol). *Analysis.*—Calc'd for $C_{17}H_{19}NO_2$: C, 75.78; H, 7.11. Found: C, 74.67; H, 6.89. The desoxynorcodeine was reacted with ethanolic hydrogen bromide and the crystalline material which separated was recovered by filtration and dried to give substantially pure desoxynorcodeine hydrobromide; M. P. 310–311° C. *Analysis.*—Calc'd for $C_{17}H_{19}NO_2 \cdot HBr$: C, 58.29; H, 5.76. Found: C, 58.42; H, 5.49, $[\alpha]_D^{25}=-23°$ (C, 0.52 in ethanol).

(3) A solution of 4 g. of desoxynorcodeine in 25 ml. of 50% aqueous acetic acid was reacted with hydrogen at a pressure of about 40 pounds per square inch and at about 25 to 30° C. in the presence of 0.1 g. of palladium chloride catalyst. The reaction mixture was filtered thereby removing the catalyst and the filtered solution was made slightly alkaline with aqueous sodium hydroxide solution. The amorphous gummy material which precipitated was extracted into chloroform; the chloroform extracts were dried over magnesium sulfate and evaporated to dryness under reduced pressure to give dihydrodesoxynorcodeine which was obtained in the form of a residual oil. The dihydrodesoxynorcodeine was dissolved in ethanol and the solution was added to an ethanolic solution of hydrogen bromide. The reaction solution was cooled to about 0° C. and the crystalline material which precipitated was recovered and recrystallized from ethanol-ether to give substantially pure dihydrodesoxynorcodeine hydrobromide; M. P. 305–308° C. *Analysis.*—Calc'd for $C_{17}H_{21}NO_2 \cdot HBr$: C, 57.95; H, 6.30. Found: C, 58.36; H, 6.36.

*Example 2*

A solution of 927 mg. of N-allyldesoxynorcodeine in 25 ml. of a 50% aqueous acetic acid solution was reacted with hydrogen at a pressure of about 40 pounds per square inch and at a temperature of about 25 to 30° C. in the presence of 0.25 g. of palladium chloride catalyst. The reaction mixture was filtered thereby removing the catalyst. The filtered solution was cooled and to the cooled solution was added an aqueous solution of ammonium hydroxide, whereupon an oil separated. The aqueous alkaline mixture was extracted with chloroform, and the chloroform evaporated from the resulting chloroform extract to give N - n - propyldihydrodesoxynorcodeine which was obtained as an amorphous solid. This residual amorphous solid material was dissolved in 3 ml. of absolute ethanol and to the ethanolic solution was added a solution of 600 mg. of tartaric acid in 3 ml. of absolute ethanol. The crystalline material which separated was recovered by filtration and recrystallized from 4 ml. of absolute ethanol to give substantially pure N-n-propyldihydrodesoxynorcodeine tartrate; M. P. 101–103° C.; $[\alpha]_D^{25}=-35.2°$ (C, 0.7 in absolute ethanol). Another sample of the amorphous N-n-propyldihydrodesoxynorcodeine was reacted with an alcoholic solution of hydrogen bromide to give substantially pure N-n-propyldihydrodesoxynorcodeine; M. P. 282–283° C., $[\alpha]_D^{25}=-62°$ (C, 0.03 in ethanol). *Analysis.*—Calc'd for $C_{20}H_{27}NO_2 \cdot HBr$: C, 60.93; H, 7.16. Found: C, 61.21; H, 6.86.

N-allyldesoxynorcodeine utilized as starting material in the foregoing process can be prepared in accordance with the following four-step procedure: (1) Thirty-five grams of normorphine and 7.95 g. of allyl bromide is dissolved in 350 cc. of chloroform and the solution is heated in a sealed tube at a temperature of 110° C. for a period of three and one-half hours. The reaction mixture is filtered, and the residual solid material extracted with chloroform. The chloroform extract is evaporated to dryness in vacuo, and the residual material is triturated with 75 cc. of ether. The resulting mixture is cooled to approximately 0° C. and maintained at that temperature for a period of about two hours. The precipitated material is recovered from the resulting slurry by filtration, and is extracted for fifteen hours with anhydrous ether utilizing a Soxhlet extractor. The ether extract is evaporated in the absence of air to incipient crystallization, cooled to 0° C. and maintained at that temperature for a period of about fifteen hours. The crystalline material which separates is recovered by filtration, washed with ether and dried in vacuo to give substantially pure N-allylnormorphine; M. P. 208–209° C.

(2) One equivalent weight of phenyltrimethyl-ammonium choloride is added to an ethanol solution containing approximately one equivalent weight of sodium ethoxide. The resulting mixture is filtered thereby removing the precipitated sodium chloride, and to the filtered ethanolic solution containing approximately one equivalent of phenyltrimethyl-ammonium hydroxide is added one equivalent weight of N-allylnormorphine. The resulting mixture is heated and the ethanol distilled therefrom until the temperature of the distilland is approximately 120° C. The reaction mixture is then cooled and an excess of acetic acid (approximately 1.2 equivalents) is added to the cooled mixture. The rehydroxide solution to render the mixture slightly alkaline, and this aqueous alkaline mixture is extracted with sulting mixture is subjected to steam distillation thereby steam distilling the by-product dimethyl aniline. To the aqueous distilland is added sufficient aqueous sodium chloroform. The chloroform is evaporated from the resulting chloroform extract and the residual crystalline material is washed with ether and dried to give N-allyl-norcodeine.

(3) A solution of 3.25 g. of N-allylnorcodeine in 3.2 ml. of dry pyridine is cooled to a temperature of about −10° C. and to the cold solution is added a solution of 2.2 g. of p-toluene sulfonyl chloride in 2.2 ml. of dry pyridine. The resulting mixture is allowed to stand at a temperature of 0° C. for a period of four hours and the reaction mixture is then poured into 110 ml. of cold water containing 1.5 g. of sodium bicarbonate. The gummy material which precipitates is recovered by decantation, washed with cold water and extracted into chloroform. The chloroform extract is washed with water, then with an aqueous solution of sodium bicarbonate, and again with water. The chloroform is evaporated under reduced pressure from the washed chloroform extract, and the residual gummy material is dissolved in ether. To this ether solution is added an excess of ethanolic hydrogen bromide, and the crystalline material which precipitates is recovered by filtration and recrystallized from methanol to give substantially pure 6-(p-toluenesulfonyl)-N-allylnorcodeine hydrochloride; M. P. 145–146° C. This material is dissolved in water, dilute aqueous sodium hydroxide is added to the solution, and the resulting aqueous alkaline mixture is extracted with ether. The ethereal extract is washed with water, dried and the ether evaporated to give crystalline 6-(p-toluenesulfonyl)-N-allylnorcodeine; M. P. 110–111° C.

(4) A solution of 2 g. of 6-(p-toluenesulfonyl)-N-allylnorcodeine in 20 ml. of purified tetrahydrofuran is slowly added to a solution of 0.6 g. of lithium aluminum hydride in 30 ml. of purified tetrahydrofuran. After the initial mildly exothermic reaction has subsided, the mixture is heated under reflux for a period of four hours. Fifty milliliters of ether is added to the reaction mixture followed by the dropwise addition of water to decompose unreacted lithium aluminum hydride. The crystalline material which precipitates is recovered by filtration and dissolved in hot ether. The ethereal solution is washed with water, dried over anhydrous magnesium sulfate, and the dry ethereal solution is evaporated to dryness. The residual material is recrystallized from ether to give substantially pure N-allyldesoxynorcodeine; M. P. 75–77° C.

Various changes and modifications may be made in carrying out the present invention without departing from the spirit and scope thereof. Insofar as these changes and modifications are within the purview of the annexed claims, they are to be considered as part of my invention.

I claim:

1. A compound selected from the group which consists of N-substituted dihydrodesoxynorcodeine compounds having attached to the nitrogen atom a radical selected from the group consisting of N-n-propyl, N-isobutyl, N-allyl and N-methallyl radicals, and acid addition salts thereof.

2. N-n-propyldihydrodesoxynorcodeine.
3. N-n-propyldihydrodesoxynorcodeine hydrochloride.
4. N-isobutyldihydrodesoxynorcodeine.
5. N-allyldihydrodesoxynorcodeine.
6. N-allyldihydrodesoxynorcodeine sulfate.

7. The process which comprises reacting in the presence of an acid-binding agent comprising an alkaline carbonate dihydrodesoxynorcodeine with an aliphatic halide, selected from the group which consists of N-n-propyl halides, N-isobutyl halides, N-allyl halides, and N-methallyl halides, thereby forming the corresponding N-substituted dihydrodesoxynorcodeine compound.

8. The process which comprises reacting dihydrodesoxynorcodeine with an n-propyl halide in the presence of an alkali metal carbonate to produce N-n-propyl-dihydrodesoxynorcodeine.

9. The process which comprises reacting dihydrodesoxynorcodeine with an isobutyl halide in the presence of an alkali metal carbonate to produce N-isobutyl-dihydrodesoxynorcodeine.

10. The process which comprises reacting dihydrodesoxynorcodeine with an allyl halide in the presence of an alkali metal carbonate to produce N-allyldihydrodesoxynorcodeine.

11. The process which comprises reacting dihydrodesoxynorcodeine with allyl bromide, said reaction being carried out by heating the reactants together in absolute ethanol under reflux in the presence of sodium bicarbonate, thereby forming N-allyldihydrodesoxynorcodeine.

12. The process which comprises reacting an N-substituted desoxynorcodeine compound, having attached to the nitrogen atom a radical selected from the group consisting of N-n-propyl, N-isobutyl, N-allyl and N-methallyl radicals, with hydrogen under pressure in the presence of a noble metal hydrogenation catalyst, thereby forming the corresponding N-substituted dihydrodesoxynorcodeine compound.

13. The process which comprises reacting together, in a medium comprising aqueous acetic acid in the presence of palladium chloride catalyst, N-allyldesoxynorcodeine and hydrogen, thereby forming N-n-propyldihydrodesoxynorcodeine.

References Cited in the file of this patent

UNITED STATES PATENTS 1,980,972   Small _____ Nov. 13, 1934

OTHER REFERENCES

Pohl: Chem. Zent. 1916, I, 1169.
Braun: Ber. 49, 977–89 (1916).